United States Patent
Uchiyama et al.

(10) Patent No.: US 10,571,975 B2
(45) Date of Patent: Feb. 25, 2020

(54) HINGE DEVICE FOR A PORTABLE COMPUTER

(71) Applicant: LENOVO (SINGAPORE) PTE. LTD., Singapore (SG)

(72) Inventors: Yoshiharu Uchiyama, Kanagawa-ken (JP); Shigehiro Horiuchi, Tokyo-to (JP); Ryota Nohara, Kanagawa-ken (JP); Hiroaki Kinoshita, Kanagawa-ken (JP)

(73) Assignee: Lenovo (Singapore) PTE LTD, Singapore (SG)

( * ) Notice: Subject to any disclaimer, the term of this patent is extended or adjusted under 35 U.S.C. 154(b) by 293 days.

(21) Appl. No.: 15/068,258

(22) Filed: Mar. 11, 2016

(65) Prior Publication Data

US 2016/0266615 A1    Sep. 15, 2016

(30) Foreign Application Priority Data

Mar. 11, 2015 (JP) ................ 2015-048438

(51) Int. Cl.
*G06F 1/16* (2006.01)
*E05D 11/08* (2006.01)

(52) U.S. Cl.
CPC ............ *G06F 1/1681* (2013.01); *E05D 11/08* (2013.01)

(58) Field of Classification Search
CPC ..... E05D 11/08; E05D 11/081; E05D 11/082; E05D 11/084; E05D 2011/085; E05D 11/087; E05D 3/122

USPC ............... 16/354, 337, 341, 342, 347, 366
See application file for complete search history.

(56) References Cited

U.S. PATENT DOCUMENTS

| | | | | |
|---|---|---|---|---|
| 1,128,797 A * | 2/1915 | Lindsey | .................. | B66D 5/00 16/337 |
| 1,877,846 A * | 9/1932 | Getz | ........................ | E05D 3/12 16/354 |
| 4,916,926 A * | 4/1990 | Shieh | ....................... | B62H 1/02 16/337 |
| 5,102,084 A * | 4/1992 | Park | ..................... | G06F 1/1616 16/338 |
| 5,867,872 A * | 2/1999 | Katoh | ................... | E05D 11/087 16/337 |
| 6,581,893 B1 * | 6/2003 | Lu | ......................... | F16M 11/10 16/337 |

(Continued)

FOREIGN PATENT DOCUMENTS

| CN | 101124414 A | 2/2008 |
|---|---|---|
| JP | 04-162285 A | 6/1992 |

(Continued)

*Primary Examiner* — Jeffrey O'Brien
(74) *Attorney, Agent, or Firm* — Russell Ng PLLC; Antony P. Ng

(57) ABSTRACT

A hinge device capable of generating a desired rotational torque and having a reduced size of a device configuration for a portable computer is disclosed. The hinge device includes a first shaft, a first torque generation mechanism and a power transmission mechanism. The first shaft is attached to one of a first and second chassis. The first torque generation mechanism is configured to apply a rotational torque to the first shaft. The power transmission mechanism is configured to transmit rotations of the first shaft to the first torque generation mechanism.

11 Claims, 6 Drawing Sheets

(56) References Cited

U.S. PATENT DOCUMENTS

| | | | |
|---|---|---|---|
| 7,669,287 B2* | 3/2010 | Lee | G06F 1/1616 16/327 |
| 8,959,716 B2* | 2/2015 | Hsu | E05D 3/06 16/302 |
| 9,115,750 B2* | 8/2015 | Park | F16C 11/10 |
| 9,122,455 B2* | 9/2015 | Meyers | E05D 3/122 |
| 9,127,490 B2* | 9/2015 | Chen | E05D 3/122 |
| 9,274,550 B2* | 3/2016 | Mau | G06F 1/1601 |
| 9,310,849 B2* | 4/2016 | Hsu | E05D 3/122 |
| 9,439,311 B2* | 9/2016 | Hsu | E05D 3/122 |
| 2008/0040887 A1* | 2/2008 | Dickerson | B60R 11/02 16/342 |
| 2011/0265288 A1* | 11/2011 | Chiang | G06F 1/1681 16/341 |
| 2011/0289728 A1* | 12/2011 | Wang | E05D 3/122 16/337 |
| 2014/0063750 A1* | 3/2014 | Mau | G06F 1/1601 361/728 |

FOREIGN PATENT DOCUMENTS

| | | |
|---|---|---|
| JP | 2006-046616 A | 2/2006 |
| JP | 2012-181625 A | 9/2012 |

* cited by examiner

HINGE DEVICE FOR A PORTABLE COMPUTER

PRIORITY CLAIM

The present application claims benefit of priority under 35 U.S.C. §§ 120, 365 to the previously filed Japanese Patent Application No. JP2015-048438 with a priority date of Mar. 11, 2015, which is incorporated by reference herein.

BACKGROUND OF THE INVENTION

1. Technical Field

The present invention relates to hinge devices in general, and particularly to a portable computer having a hinge device for coupling two chassis to each other so that the two chassis can be opened and closed.

2. Description of Related Art

Portable information equipment such as a cellular phone or a notebook personal computer (laptop PC) employs a configuration in which a display chassis is coupled to a main body chassis by using a hinge device so that the display chassis and the main body chassis can be opened or closed. Some laptop PCs include a hinge device having a uniaxial structure that rotatably supports a shaft disposed at an upper end of a hinge block standing on a back end portion of a main body chassis and fixed to a back end portion of a display chassis. Other laptop PCs (convertible PCs) include a hinge device having a biaxial structure that rotatably supports a shaft disposed at an upper end of a hinge block and fixed to a back end portion of a display chassis and rotatably supports a shaft disposed at a lower end of the hinge block and fixed to a back end portion of a main body chassis, and this display chassis can be inverted to a 360-degree position.

To obtain stable opening/closing operability of the display chassis, for example, and enable stable holding of the display chassis in a desired angle position, the hinge device of the portable information equipment as described above needs to generate a sufficiently large rotational torque. In view of this, a hinge device of a related art portable information equipment employs a torque generation mechanism in which a rotary plate is provided coaxially with a rotation shaft fixed to a display chassis and a main body chassis and a stationary plate for generating a frictional force with the rotary plate is provided at a hinge block.

In the field of portable information equipment, the thickness of chassis has rapidly decreased. Thus, hinge devices each for coupling two chassis to each other are required of reduction in the thickness direction of the chassis. A biaxial structure has needed to conform with the reduced thickness of equipment by reducing the distance between two shafts.

On the other hand, to generate a desired rotational torque by the torque generation mechanism, a certain contact area needs to be obtained between the rotary plate and the stationary plate, and reduction of this contact area has a limitation. That is, there has been a problem that the torque generation mechanism is an obstacle to size reduction of the entire hinge device.

Consequently, it would be desirable to provide an improved hinge device that can reduce the size of a device configuration and can generate a desired rotational torque.

SUMMARY OF THE INVENTION

In accordance with a preferred embodiment of the present invention, a hinge device includes a first shaft, a first torque generation mechanism and a power transmission mechanism. The first shaft is attached to one of a first and second chassis. The first torque generation mechanism is configured to apply a rotational torque to the first shaft in addition, the first torque generation mechanism is shifted from an extended line from an axis line of the first shaft. The power transmission mechanism is configured to transmit rotations of the first shaft to the first torque generation mechanism.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
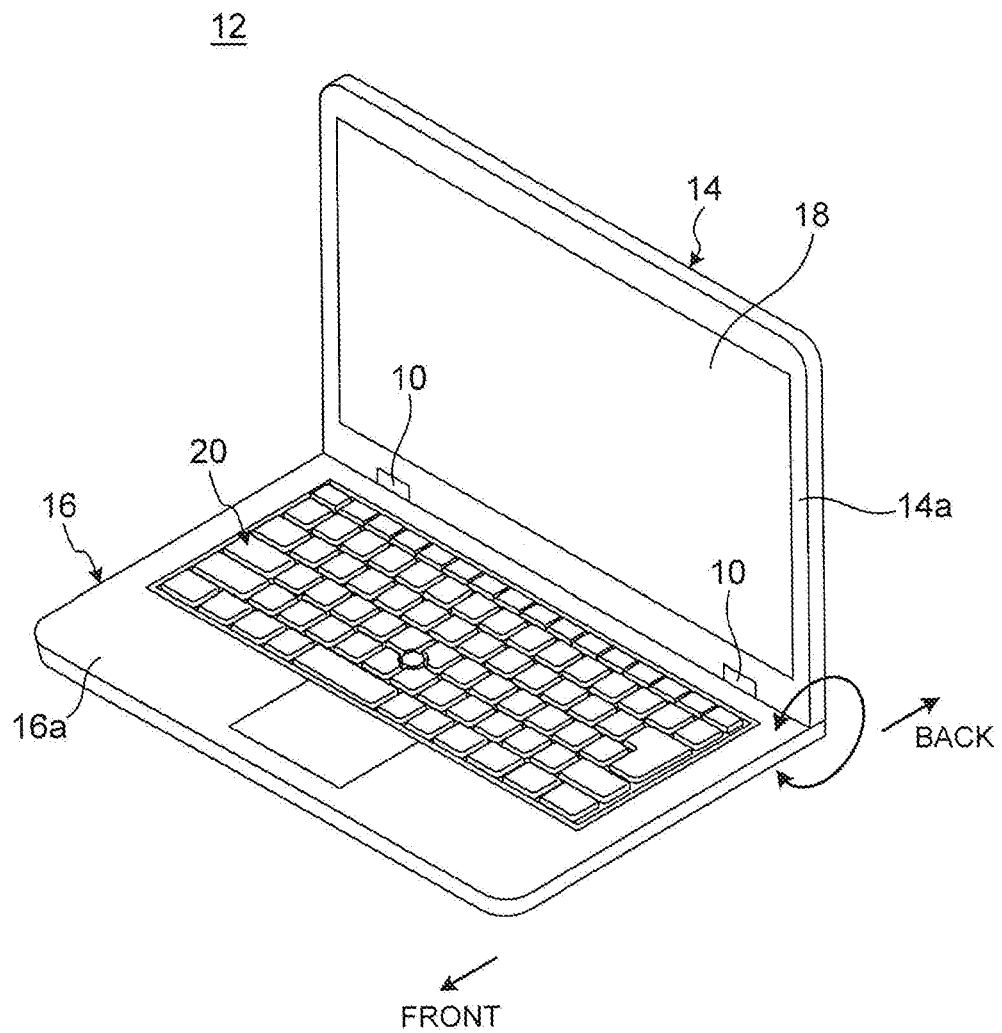
FIG. 1 is a perspective view of portable computer having a hinge device, in accordance with a preferred embodiment of the present invention.

Referring now to the drawings and in particular to FIG. 1, there is depicted a perspective view of portable information equipment 12 including a hinge device 10 according to a first embodiment of the present invention. The portable information equipment 12 of this embodiment is a so-called convertible PC that includes the hinge device having a biaxial structure, and thereby, is favorably used as a laptop PC (see FIG. 1) by rotating a display chassis 14 to an about 90-degree position with respect to a main body chassis 16, and is favorably used as a tablet PC by rotating the display chassis 14 to a 360-degree position with respect to the main body chassis 16. The present invention is favorably applicable not only to such a convertible PC but also to electronic equipment such as general laptop PC in which the display chassis 14 rotationally moves only to about a 180-degree position, for example, cellular phones, smart phones, and electronic organizers as long as two chassis are coupled to each other so that the two chassis can be opened and closed.

The following description will be made based on a state in which the display chassis 14 is closed with respect to the main body chassis 16 (0-degree position) from a position illustrated in FIG. 1, ends of the display chassis 14 and the main body chassis 16 facing the hinge device 10 will be referred to as back ends (backward), their opposite ends of the display chassis 14 and the main body chassis 16 will be referred to as front ends (forward), a thickness direction will be referred to as a vertical direction, and a width direction will be hereinafter referred to as a lateral direction.

As illustrated in FIG. 1, in the portable information equipment 12, a back end portion of the display chassis 14 provided with a display 18 in an inner surface 14a thereof is rotatably coupled to a back end portion of the main body chassis 16 provided with a keyboard 20 in an upper surface 16a thereof by using a pair of left and right hinge devices 10 and 10.

The display chassis 14 has a flat plate shape thinner than the main body chassis 16. The display chassis 14 is coupled to the main body chassis 16 by the hinge devices 10 provided on the back end portion thereof, and is electrically connected to the main body chassis 16 through cables 22 (see FIG. 2) passing through the hinge devices 10. The display 18 is constituted by a touch panel liquid crystal display device, for example.

The main body chassis 16 is a box having a flat plate shape. The main body chassis 16 is coupled to the display chassis 14 by using the hinge devices 10 provided on the back end portion of the main body chassis 16. The upper surface 16a of the main body chassis 16 is provided with an input unit such as the keyboard 20. The main body chassis 16 includes, therein, a board, an arithmetic unit, and electronic parts such as a memory, which are not illustrated. The keyboard 20 may be configured to be shown on an unillustrated touch panel display provided on the upper surface 16a of the main body chassis 16.

Figure 2:
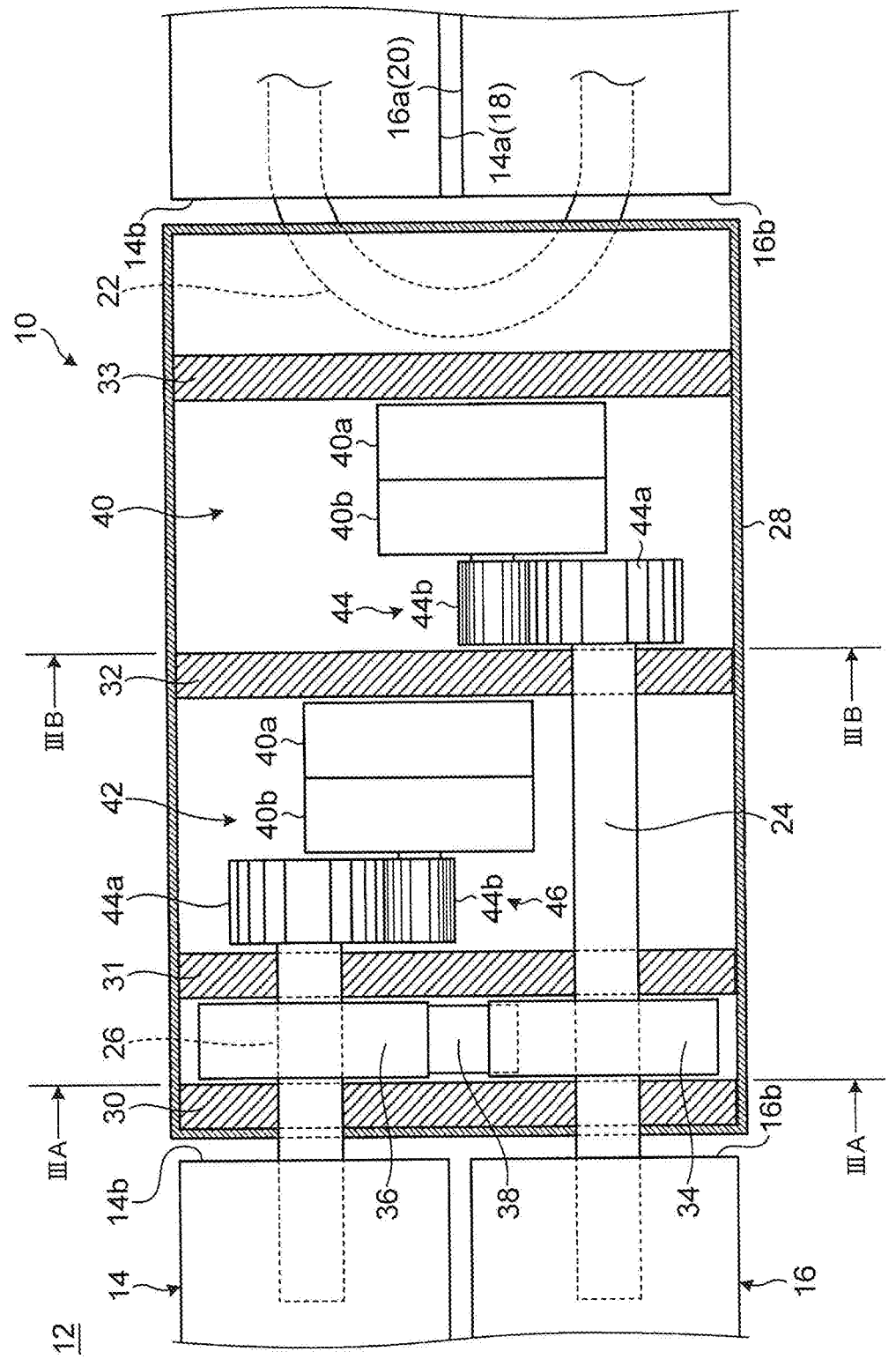
FIG. 2 is a front cross-sectional view of a hinge device, in accordance with a preferred embodiment of the present invention.
Figure 3A:
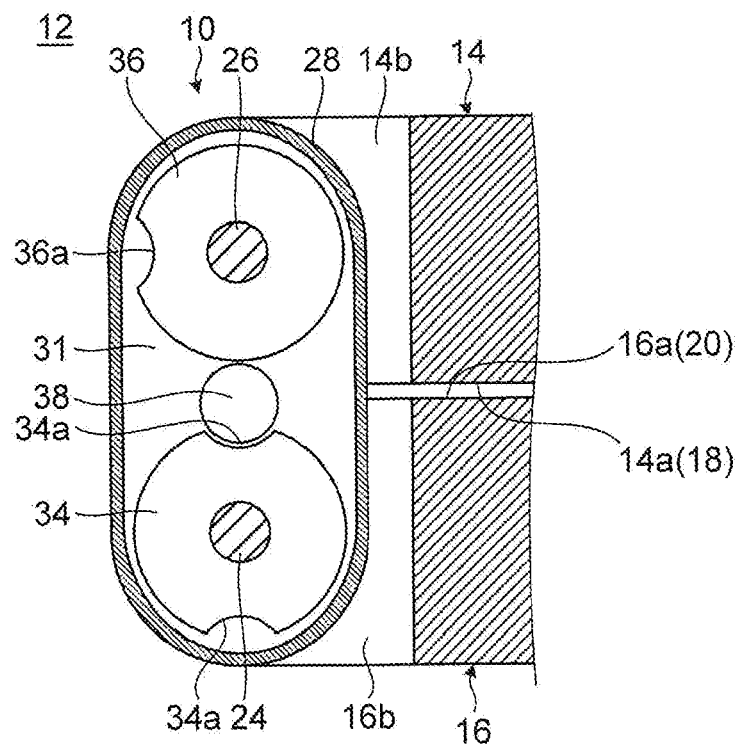
FIG. 3A is a cross-sectional view taken along line IIIA-IIIA in FIG. 2.
Figure 3B:
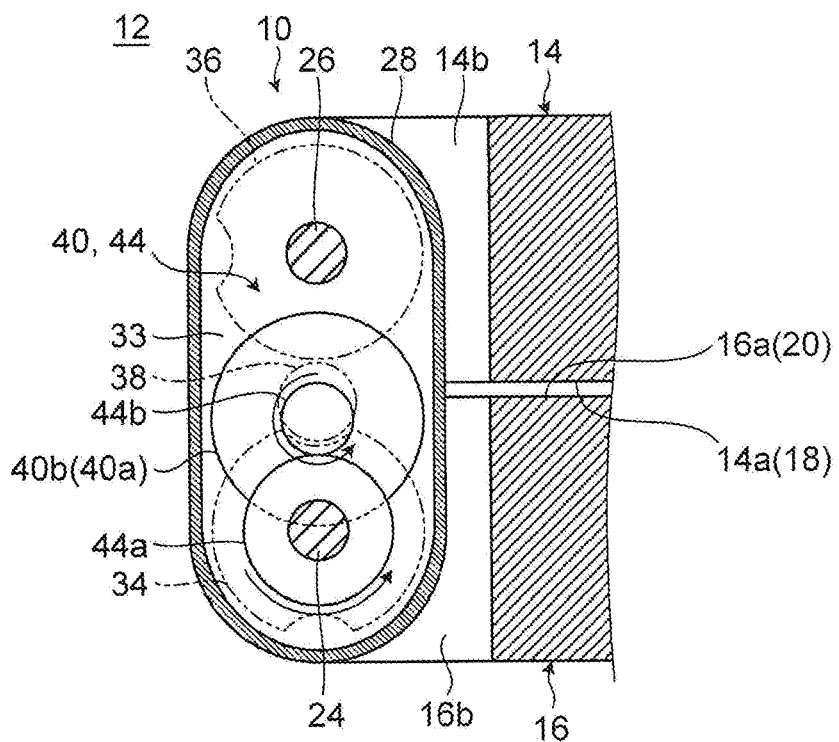
FIG. 3B is a cross-sectional view taken along line IIIB-IIIB in FIG. 2.

FIG. 2 is a front cross-sectional view schematically illustrating a configuration of the hinge device 10 of the first embodiment of the present invention, where the hinge device 10 in which the display chassis 14 is closed with respect to the main body chassis 16 in a 0-degree position is viewed from the front side. FIGS. 3A and 3B are side cross-sectional views schematically illustrating the configuration of the hinge device 10 illustrated in FIG. 2. FIG. 3A is a cross-sectional view taken along line IIIA-IIIA in FIG. 2, and FIG. 3B is a cross-sectional view taken along line IIIB-IIIB in FIG. 2.

As illustrated in FIGS. 2, 3A, and 3B, the biaxial structure of the hinge device 10 enables rotational movement of the display chassis 14 with respect to the main body chassis 16 from a 0-degree position to a 360-degree position. The hinge device 10 includes a first shaft (rotation shaft) 24 non-rotatably coupled to the main body chassis 16, a second shaft (rotation shaft) 26 non-rotatably coupled to the display chassis 14 and extending in the lateral direction, and a box-shaped hinge block (hinge chassis) 28 rotatably holding the first shaft 24 and the second shaft 26. The hinge block 28 extends between notches 14b and 16b provided in back end portions of the display chassis 14 and the main body chassis 16, respectively.

The first shaft 24 integrally rotates with the main body chassis 16 by inserting and fixing an end of the first shaft 24 into the main body chassis 16. The second shaft 26 integrally rotates with the display chassis 14 by inserting and fixing an end of the second shaft 26 into the display chassis 14. The first shaft 24 is rotatably held by support plates 30 to 32 among support plates 30, 31, 32, and 33 that are arranged side by side in the lateral direction in the hinge block 28. The second shaft 26 is rotatably held by the support plates 30 and 31. The first shaft 24 and the second shaft 26 protrude from a side surface of the hinge block 28 to be coupled to the main body chassis 16 and the display chassis 14, respectively. In this manner, the main body chassis 16 is rotatably supported by the hinge block 28 together with the first shaft 24. The display chassis 14 is rotatably supported by the hinge block 28 together with the second shaft 26. The first shaft 24 and the second shaft 26 may be configured in such a manner that both ends of each of the first shaft 24 and the second shaft 26 protrude from the hinge block 28 to be coupled to the main body chassis 16 or the display chassis 14.

As illustrated in FIGS. 2 and 3A, in the hinge device 10, a float pin 38 capable of reciprocating between a first circular plate 34 and a second circular plate 36 and rotatably supported is provided to be "sandwiched" between the first circular plate 34 fitted and fixed onto the first shaft 24 between the support plates 30 and 31 and the second circular plate 36 fitted and fixed onto the second shaft 26 between the support plates 30 and 31.

A float pin 38 is selectively engaged with a depression 34a formed in an outer peripheral surface of the first circular plate 34 or a depression 36a formed in an outer peripheral surface of the second circular plate 36, in accordance with an opening angle position of the display chassis 14 with respect to the main body chassis 16. In this manner, rotation of the shaft (the first shaft 24 or the second shaft 26) engaged with the float pin 38 is restricted, and rotation of one of the shafts 24 and 26 is selectively allowed in accordance with the opening angle position of the display chassis 14. For example, in a chassis where the display chassis 14 is positioned between the 0-degree position and the 90-degree position with respect to the main body chassis 16, only the second shaft 26 rotates. On the other hand, in a chassis where the display chassis 14 is positioned between the 90-degree position and the 270-degree position, only the first shaft 24 rotates. In a chassis where the display chassis 14 is positioned between the 270-degree position and the 360-degree position, only the second shaft 26 rotates. In this manner, smooth opening/closing operation of the display chassis 14 is enabled.

Such a rotation shaft selecting function of the float pin 38 may be omitted. Alternatively, an unillustrated gear train may be interposed between the first shaft 24 and the second shaft 26 so that the shafts 24 and 26 rotate in synchronization with each other.

As illustrated in FIGS. 2 and 3B, the hinge device 10 includes a first torque generation mechanism 40 that applies a rotational torque to the first shaft 24, a second torque generation mechanism 42 that applies a rotational torque to the second shaft 26, and power transmission mechanisms 44 and 46 that transmit rotation of the shafts 24 and 26 to the torque generation mechanisms 40 and 42.

The first torque generation mechanism 40 is disposed between the support plates 32 and 33 in the hinge block 28. The first torque generation mechanism 40 includes a circular plate-shaped stationary plate (stationary body) 40a fixed on the support plate 33 and a circular plate-shaped rotary plate (rotary body) 40b that can contact the stationary plate 40a slidingly. A shaft center of the rotary plate 40b (and the stationary plate 40a) is shifted from an extended line from an axis line of the first shaft 24, e.g., is offset upward in this example. The stationary plate 40a and the rotary plate 40b rotate relative to each other about the axis, and generate a predetermined frictional force between slide contact surfaces thereof, thereby applying a predetermined rotational torque to the first shaft 24 through the power transmission mechanism 44. The stationary plate 40a and the rotary plate 40b are constituted by two or more stacked spring washers or predetermined friction plates. For example, the stationary plate 40a may be a cylindrical stationary cylinder so that the rotary plate 40b constituted by a cylindrical rotary rod is slidingly and rotatably inserted into the stationary cylinder.

The power transmission mechanism 44 is disposed between the support plates 32 and 33, together with the first torque generation mechanism 40. The power transmission mechanism 44 includes a driving gear 44a fitted onto an end of the first shaft 24 and a driven gear 44b configured to be meshed with the driving gear 44a and coaxially fixed to the rotary plate 40b. In this embodiment, the number of teeth of the driven gear 44b is smaller than the number of teeth of the driving gear 44a. With this configuration, the driven gear 44b rotates more than one turn, e.g., 1.5 turns, while the driving gear 44a rotates one turn, and thereby, the driving gear 44a and the driven gear 44b constitute an acceleration mechanism. In this embodiment, the driven gear 44b is disposed above the driving gear 44a (see FIG. 3B).

The second torque generation mechanism 42 and the power transmission mechanism 46 have similar structures as those of the first torque generation mechanism 40 and the power transmission mechanism 44 except that the second torque generation mechanism 42 and the power transmission mechanism 46 are disposed between the support plates 31 and 32. Specifically, the second torque generation mechanism 42 includes a circular plate-shaped stationary plate 40a fixed on the support plate 32 and a circular plate-shaped rotary plate 40b that can contact the stationary plate 40a slidingly. A shaft center of the rotary plate 40b (and the stationary plate 40a) is shifted from an extended line from an axis line of the second shaft 26, i.e., is offset downward in this example. The power transmission mechanism 46 includes a driving gear 44a fitted onto an end of the second shaft 26 and a driven gear 44b having a smaller number of teeth than the driving gear 44a, engaged with the driving gear 44a, and coaxially fixed to the rotary plate 40b. In the power transmission mechanism 46, the driven gear 44b is disposed below the driving gear 44a (see FIG. 2).

An operation and advantages of the hinge device 10 are described as follows.

In the portable information equipment 12 including the hinge device 10 of this embodiment, when the display chassis 14 is opened with respect to the main body chassis 16, the rotation shaft selecting function of the float pin 38 causes the first shaft 24 or the second shaft 26 to rotate appropriately in accordance with an opening angle position of the display chassis 14.

For example, when the first shaft 24 rotates, this rotation is transmitted from the driving gear 44a of the power transmission mechanism 44 to the driven gear 44b. When the rotary plate 40b of the first torque generation mechanism 40 then rotates, the rotary plate 40b slidingly contacts the stationary plate 40a at the same time, and accordingly, the first shaft 24 rotates at a predetermined rotational torque. As another example, when the second shaft 26 rotates, this rotation is transmitted from the driving gear 44a of the power transmission mechanism 46 to the driven gear 44b. When the rotary plate 40b of the second torque generation mechanism 42 then rotates, the rotary plate 40b slidingly contacts the stationary plate 40a at the same time, and accordingly, the second shaft 26 rotates at a predetermined rotational torque. In this manner, stable opening/closing operability of the display chassis 14 can be obtained, and the display chassis 14 can be stably held in a desired angle position. Thus, the display chassis 14 cannot be rattled in the 90-degree position for application to a laptop PC, for example.

In this chassis, in the hinge device 10, the first torque generation mechanism 40 is shifted from the extended line from the axis line of the first shaft 24, and the second torque generation mechanism 42 is shifted from the extended line from the axis line of the second shaft 26. Accordingly, the first torque generation mechanism 40 and the second torque generation mechanism 42 can be disposed in the hinge block 28 with high flexibility. Even in a chassis where the inter-shaft distance between the shafts 24 and 26 is small, interference between the first torque generation mechanism 40 and the second torque generation mechanism 42 can be avoided. As a result, the height of the hinge block 28 can be minimized so that the size of the hinge device 10 can be reduced and the thickness of the portable information equipment 12 including the hinge device 10 can be reduced. The power transmission mechanisms 44 and 46 provided between the shafts 24 and 26 and the torque generation mechanisms 40 and 42 can further enhance flexibility in disposing the torque generation mechanisms 40 and 42.

In addition, in the power transmission mechanisms 44 and 46, the number of teeth of the driven gear 44b is smaller than the number of teeth of the driving gear 44a. Thus, the number of revolutions of the rotary plate 40b of the first torque generation mechanism 40 and the second torque generation mechanism 42 is larger than that of the shafts 24 and 26. Accordingly, even in a chassis where the contact area between the rotary plate 40b and the stationary plate 40a is reduced by reducing the outer diameters of the rotary plate 40b and the stationary plate 40a, a large frictional force can be generated by increasing the number of revolutions. As a result, the sizes of the first torque generation mechanism 40 and the second torque generation mechanism 42 can be reduced, and the size of the hinge device 10 can be further reduced. In other words, preparation of the first torque generation mechanism 40 and the second torque generation mechanism 42 constituted by the rotary plate 40b and the stationary plate 40a having a common outer diameter for various types of portable information equipment enables a desired rotational torque in accordance with specifications, such as weight, of the display chassis 14 only by adjusting a gear ratio between the driving gear 44a and the driven gear 44b in the power transmission mechanisms 44 and 46. Thus, cost reduction and versatility can be obtained by sharing components.

Figure 4:
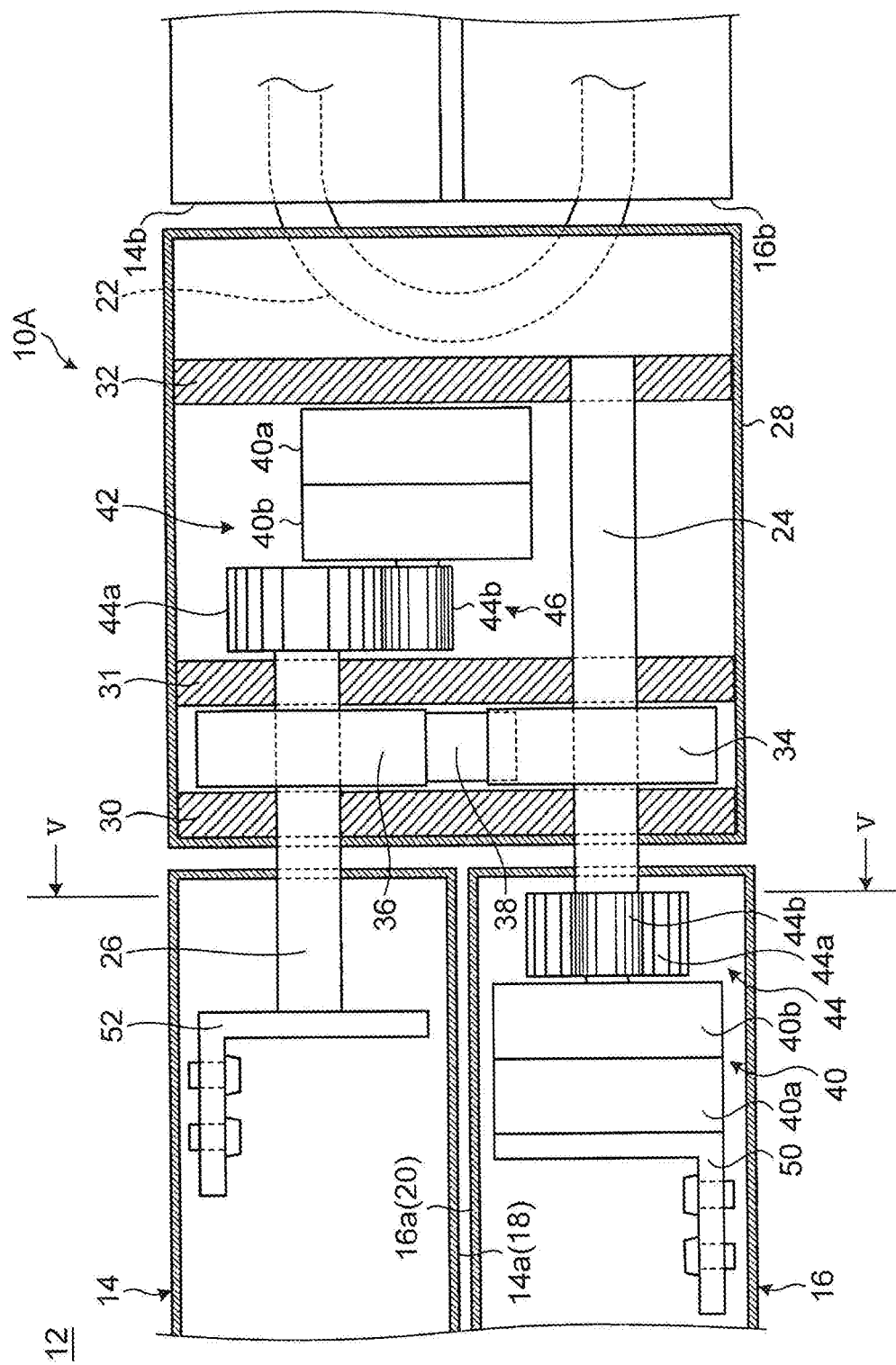
FIG. 4 is a front cross-sectional view of a hinge device, in accordance with a second embodiment of the present invention.
Figure 5:
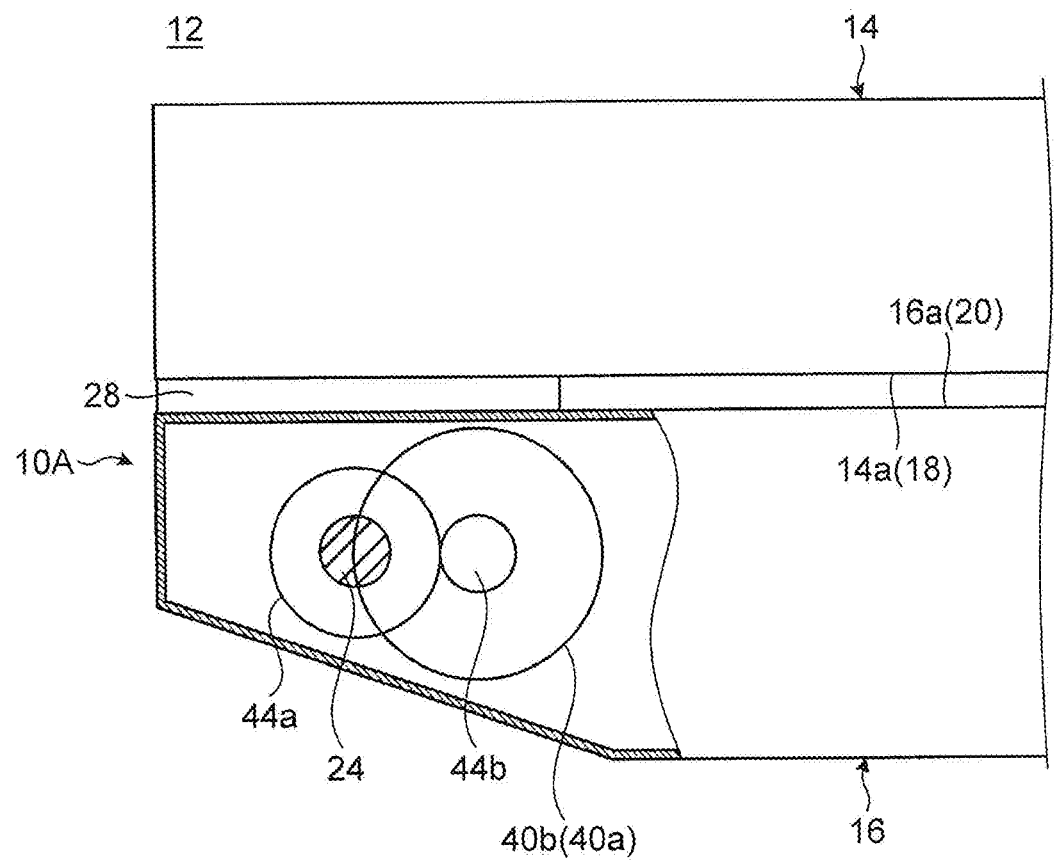
FIG. 5 is a cross-sectional view taken along line V-V in FIG. 4.

FIG. 4 is a front cross-sectional view schematically illustrating a configuration of a hinge device 10A according to a second embodiment of the present invention, where the hinge device 10A in which a display chassis 14 is closed with respect to a main body chassis 16 in a 0-degree position is viewed from the front side. FIG. 5 is a side cross-sectional view taken along line V-V in FIG. 4 and schematically illustrates the configuration of the hinge device 10A.

As illustrated in FIGS. 4 and 5, the hinge device 10A of this embodiment is different from the hinge device 10 of the first embodiment described above in that a first torque generation mechanism 40 and a power transmission mechanism 44 acting on one shaft, which is the first shaft 24 in this example, are disposed not in a hinge block 28 but in one chassis, which is a main body chassis 16 in this example.

In the first torque generation mechanism 40, a stationary plate 40a is fixed onto a support bracket 50 screwed into the main body chassis 16. In this embodiment, a driven gear 44b is disposed forward of a driving gear 44a (see FIG. 5).

As illustrated in FIG. 4, an end of a second shaft 26 of the hinge device 10A is fitted and fixed into the support bracket 52 screwed into the display chassis 14. A fixing structure of fixing the second shaft 26 by the support bracket 52 may be used as the fixing structure of fixing the first shaft 24 and the second shaft 26 of the hinge device 10 of the first embodiment.

Thus, in the portable information equipment 12 including the hinge device 10A described above, when the display chassis 14 is opened with respect to the main body chassis 16 and the first shaft 24, for example, rotates, this rotation is transmitted from the power transmission mechanism 44 to the first torque generation mechanism 40. Accordingly, the first shaft 24 rotates at a predetermined rotational torque. For example, when the second shaft 26 rotates, this rotation is transmitted from the power transmission mechanism 46 to the second torque generation mechanism 42. Accordingly, the second shaft 26 rotates at a predetermined rotational torque. In this manner, stable opening/closing operability of the display chassis 14 can be obtained, and the display chassis 14 can be stably held in a desired angle position.

In addition, in the hinge device 10A, the first torque generation mechanism 40 is also shifted from an extended line from an axis line of the first shaft 24, and the second torque generation mechanism 42 is shifted from an extended line from an axis line of the second shaft 26. Thus, the height of the hinge block 28 can be reduced, the size of the hinge device 10A can be reduced, and the thickness of the portable information equipment 12 including the hinge device 10A can be reduced. The torque generation mechanisms 40 and 42 are shifted from the extended line from the axis line of the shafts 24 and 26 so that flexibility in installation can be enhanced. Thus, the first torque generation mechanism 40, for example, can be disposed in the main body chassis 16.

In addition, in the hinge device 10A, the first torque generation mechanism 40 and the power transmission mechanism 44 acting on the first shaft 24 are housed not in the hinge block 28 but in the main body chassis 16. Thus, the size of the hinge block 28 can be further reduced. At this time, in the hinge device 10A, the driving gear 44a and the driven gear 44b constituting the power transmission mechanism 44 are arranged side by side in the main body chassis 16 in a longitudinal direction (front-to-back direction) intersecting the thickness direction of the main body chassis 16. Thus, the first torque generation mechanism 40 and the power transmission mechanism 44 can be easily housed even in the main body chassis 16 having a reduced thickness. The first torque generation mechanism 40 (the rotary plate 40b and the stationary plate 40a) required of having a larger diameter than those of the driving gear 44a and the driven gear 44b constituting the power transmission mechanism 44 in order to obtain a sufficiently large frictional force is disposed forward of the driving gear 44a (see FIG. 5). In this manner, as illustrated in FIG. 5, the first torque generation mechanism 40 can be smoothly housed in the main body chassis 16 whose back end portion is further thinned, advantageously.

Although FIG. 4 illustrates the configuration of the hinge device 10A in which the first torque generation mechanism 40 and the power transmission mechanism 44 for the main body chassis 16 are housed in the main body chassis 16, the second torque generation mechanism 42 and the power transmission mechanism 46 for the display chassis 14 may be housed in the display chassis 14, or the torque generation mechanisms 40 and 42 and the power transmission mechanisms 44 and 46 may be housed in the main body chassis 16 and the display chassis 14, respectively.

Figure 6:
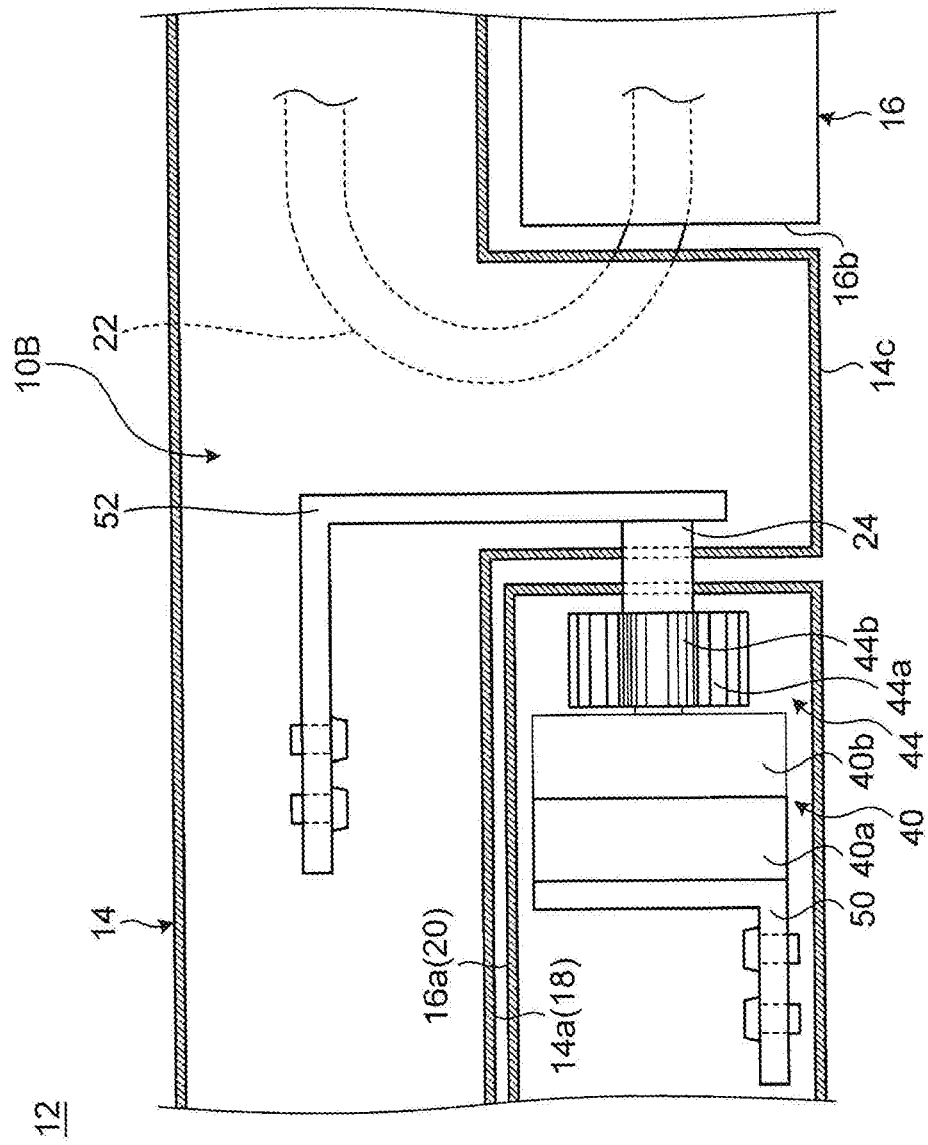
FIG. 6 is a front cross-sectional view of a hinge device, in accordance with a third embodiment of the present invention.

FIG. 6 is a front cross-sectional view schematically illustrating a configuration of a hinge device 10B according to a third embodiment of the present invention, where the hinge device 10B in which a display chassis 14 is closed with respect to a main body chassis 16 in a 0-degree position is viewed from the front side.

As illustrated in FIG. 6, the hinge device 10B of the third embodiment is different from the hinge device 10A of the second embodiment in having a uniaxial structure that does not include the other shaft, i.e., a second shaft 26 in this example, and a second torque generation mechanism 42 and a power transmission mechanism 46 acting on the shaft. In the hinge device 10B, a stationary plate 40a of a first torque generation mechanism 40 is also fixed onto a support bracket 50 screwed into a main body chassis 16 and a driven gear 44b of a power transmission mechanism 44 is disposed forward of a driving gear 44a.

In the hinge device 10B, a hinge block 28 is not provided, and a projection 14c of a display chassis 14 is inserted into a notch 16b of the main body chassis 16 so that the projection 14c substantially serves as a hinge block.

Thus, in portable information equipment 12 including the hinge device 10B described above, when the display chassis 14 is opened with respect to the main body chassis 16 and a first shaft 24 rotates, this rotation is transmitted from the power transmission mechanism 44 to a first torque generation mechanism 40. Accordingly, the first shaft 24 rotates at a predetermined rotational torque. In this manner, stable opening/closing operability of the display chassis 14 can be obtained, and the display so chassis 14 can be stably held in a desired angle position.

In the hinge device 10B, the first torque generation mechanism 40 is also shifted from an extended line from an axis line of the first shaft 24. Thus, the size of the hinge device 10B can be reduced, and the thickness of the portable information equipment 12 including the hinge device 10B can be reduced. In addition, in the hinge device 10B, the first torque generation mechanism 40 and the power transmission mechanism 44 are housed not in the hinge block 28 but in the main body chassis 16. Thus, the size of the hinge device 10B can be further reduced. At this time, the driving gear 44a and the driven gear 44b are arranged side by side in a longitudinal direction in the main body chassis 16. Thus, the first torque generation mechanism 40 and the power transmission mechanism 44 can be easily housed even in the main body chassis 16 having a reduced thickness.

Although FIG. 6 illustrates an example configuration of the hinge device 10B in which the first shaft 24, the first torque generation mechanism 40, and the power transmission mechanism 44 are provided in the main body chassis 16, instead of the first shaft 24, the first torque generation mechanism 40, and the power transmission mechanism 44, the second shaft 26, the second torque generation mechanism 42, and the power transmission mechanism 46 may be provided in the display chassis 14. In this chassis, a projection of the main body chassis 16 similar to the projection 14c can be inserted in the notch 14b of the display chassis 14. In the hinge device 10B, a hinge block 28 may be provided as in the hinge devices 10 and 10A described above so that the first torque generation mechanism 40 and the power transmission mechanism 44 (the second torque generation mechanism 42 and the power transmission mechanism 46) can be housed in the hinge block 28.

As has been described, the present disclosure provides an improved hinge device that can reduce the size of a device configuration and can generate a desired rotational torque, and portable information equipment including the hinge device.

The present invention is not limited to the embodiments described above, and various other changes and modifications may be affected therein without departing from the scope or spirit of the present invention. For example, in the example configurations of the embodiments described above, the gear train (the driving gear 44a and the driven gear 44b) is used as the power transmission mechanisms 44 and 46 coupling the shafts 24 and 26 and the torque generation mechanisms 40 and 42, respectively. Alternatively, the gear train may be replaced by a belt pulley mechanism.

While the disclosure has been particularly shown and described with reference to a preferred embodiment, it will be understood by those skilled in the art that various changes in form and detail may be made therein without departing from the spirit and scope of the disclosure.

What is claimed is:

1. A portable information equipment comprising:
    a first and second chassis; and
    a hinge device rotatably connects said first chassis to said second chassis, wherein said hinge device includes
        a first shaft having a first end attached to said first chassis, and a second shaft having a first end attached to said second chassis;
        a first power transmission mechanism having a driven gear and a driving gear attached to a second end of said first shaft;
        a first torque generation mechanism for applying a rotational torque to said first shaft via said first power transmission mechanism;
        a second power transmission mechanism having a driven gear and a driving gear attached to a second end of said second shaft; and
        a second torque generation mechanism for applying a rotational torque to said second shaft through said second power transmission mechanism.

2. The portable information equipment of claim 1, wherein said first chassis includes a display.

3. The portable information equipment of claim 2, wherein said second chassis includes a keyboard.

4. The portable information equipment of claim 1, wherein said first torque generation mechanism includes a circular stationary plate fixed on a first support plate within said hinge device and a circular rotary plate contacts said circular stationary plate slidingly.

5. The portable information equipment of claim 4, wherein said second torque generation mechanism includes a circular stationary plate fixed on a second support plate within said hinge device and a circular rotary plate contacts said circular stationary plate slidingly.

6. The portable information equipment of claim 1, wherein said driven gear of said first power transmission mechanism has less number of teeth than said driving gear of said first power transmission mechanism.

7. The portable information equipment of claim 6, wherein said driven gear of said second power transmission mechanism has less number of teeth than said driving gear of said second power transmission mechanism.

8. The portable information equipment of claim 4, wherein an axis line of said circular stationary plate and said circular rotary plate of said first torque generation mechanism is different from an axis line of said first shaft.

9. The portable information equipment of claim 5, wherein an axis line of said circular stationary plate and said circular rotary plate of said second torque generation mechanism is different from an axis line of said second shaft.

10. The portable information equipment of claim 4, wherein an axis line of said circular stationary plate and said circular rotary plate of said first torque generation mechanism is the same as an axis line of said driven gear of said first power transmission mechanism.

11. The portable information equipment of claim 5, wherein an axis line of said circular stationary plate and said circular rotary plate of said second torque generation mechanism is the same as an axis line of said driven gear of said second power transmission mechanism.

* * * * *